United States Patent [19]

Urbanski

[11] Patent Number: 5,668,871
[45] Date of Patent: Sep. 16, 1997

[54] AUDIO SIGNAL PROCESSOR AND METHOD THEREFOR FOR SUBSTANTIALLY REDUCING AUDIO FEEDBACK IN A CUMMUNICATION UNIT

[75] Inventor: Steven Adam Urbanski, Round Lake Beach, Ill.

[73] Assignee: Motorola, Inc., Schaumburg, Ill.

[21] Appl. No.: 235,614

[22] Filed: Apr. 29, 1994

[51] Int. Cl.⁶ .................................................. H04M 9/08
[52] U.S. Cl. .......................... 379/406; 379/390; 379/409; 379/410
[58] Field of Search ......................... 379/406, 410, 379/387, 388, 389, 390, 409; 370/32.1, 286, 288, 287, 289

[56] References Cited

U.S. PATENT DOCUMENTS

| | | | |
|---|---|---|---|
| 3,610,835 | 10/1971 | Reid | 379/389 |
| 4,005,277 | 1/1977 | Araseki et al. | 379/406 |
| 4,282,411 | 8/1981 | Stewart | 379/406 |
| 4,629,829 | 12/1986 | Puhl et al. | 379/390 X |
| 4,670,903 | 6/1987 | Araseki et al. | 379/410 X |
| 4,726,062 | 2/1988 | Martz et al. | 379/390 |
| 4,741,025 | 4/1988 | Maruyama et al. | 379/202 |
| 4,782,525 | 11/1988 | Sylvain et al. | 379/410 |
| 4,847,897 | 7/1989 | Means | 379/388 X |
| 4,879,745 | 11/1989 | Arbel | 379/390 X |
| 4,984,265 | 1/1991 | Connan et al. | 379/390 |
| 5,016,271 | 5/1991 | Ford | 379/410 |
| 5,075,687 | 12/1991 | Chen et al. | 370/32.1 X |
| 5,099,472 | 3/1992 | Townsend et al. | 370/32.1 |
| 5,297,198 | 3/1994 | Butani et al. | 379/389 |
| 5,313,498 | 5/1994 | Sano | 379/410 X |
| 5,343,521 | 8/1994 | Jullien et al. | 379/410 |
| 5,353,348 | 10/1994 | Sendyk et al. | 379/410 |
| 5,410,632 | 4/1995 | Hong et al. | 395/2.42 |
| 5,450,484 | 9/1995 | Hamilton | 379/351 |
| 5,471,528 | 11/1995 | Reesor | 379/390 |
| 5,544,242 | 8/1996 | Robinson | 379/406 X |

Primary Examiner—Krista M. Zele
Assistant Examiner—Devendra Kumar
Attorney, Agent, or Firm—Kevin D. Kaschke

[57] ABSTRACT

An audio signal processor (209) comprises a forward signal path (256) having a forward audio signal (257) coupled to a loudspeaker (203) for producing a first acoustic signal (263), and a reverse signal path (248) coupled to a microphone (201) for producing a reverse audio signal (243), wherein at least a portion of the first acoustic signal (263) is coupled to the microphone (201) for producing a feedback audio signal (337) on the reverse signal path (248). An attenuator (305), coupled to the microphone (201), attenuates the reverse audio signal (243) responsive to a measure of the feedback audio signal (339). The measure of the feedback audio signal (339) preferrably comprises a signal to noise ratio measurement of the feedback audio signal (337). The attenuator (305) is further responsive to at least one of the first audio signal (257), and a third audio signal (239) which may also be coupled to the reverse signal path (248). The [present invention] audio signal processor (209) advantageously reduces audio feedback in a digital radiotelephone system (102) where audio processing times are long.

28 Claims, 12 Drawing Sheets

AUDIO SIGNAL PROCESSOR AND METHOD THEREFOR FOR SUBSTANTIALLY REDUCING AUDIO FEEDBACK IN A CUMMUNICATION UNIT

FIELD OF THE INVENTION

The present invention relates generally to communication units and, more particularly, to an audio signal processor and method therefor for substantially reducing audio feedback in a communication unit.

BACKGROUND OF THE INVENTION

Communication units are well known in the art. The communication unit may comprise a telephone set. The telephone sets may be either a wireless telephone sets or a wireline telephone sets. The wireless telephone sets may be either portable or mobile telephone sets. The wireless telephone sets may be either cellular or cordless telephone sets. The telephone sets typically transmit audio signals via a microphone and receive audio signals via a loudspeaker. The audio signals may be either analog or digital audio signals. The telephone set may comprises either a "hands free" telephone set or a telephone hand set. With the hands free telephone set, the microphone and the loudspeaker are located in close proximity to the user to permit the user to engage in a telephone conversation without holding the telephone hand set. With the hands free telephone set, the microphone and the loudspeaker may be located in the same enclosure or separate enclosures. With the hands free telephone set, the user's "hands" are "free" to use for other purposes and a plurality of user may engage in the same conversation. With the telephone hand set, the microphone and the loudspeaker are located in the same enclosure such that the loudspeaker and the microphone may be substantially aligned with the user's ear and mouth, respectively, when the user holds the enclosure next to his head. The telephone handset permits the user to engage in a telephone conversation while holding the telephone hand set in one hand. Although, with the telephone hand set, the user's hand are not "free" to use for other purposes, the close coupling of the loudspeaker and the microphone with the user's ear and mouth reduces background noise and increases privacy.

A well known problem associated with communication units is acoustic feedback. This problem particularly manifests itself in hands free telephone sets. In hands free telephone sets processing analog signals, the occurrence of the acoustic feedback problem is not very frequent. This is because the acoustic feedback sounds like sidetone and frequently goes unnoticed. However, even when processing analog signals, if too much acoustic feedback enters the system, the system can become unstable, which results in "howling". In hands free telephone sets processing digital signals, not much feedback can be tolerated. In hands free telephone sets processing digital signals, the time required to process the digital signals produces a large time delay between the transmitted voice of the other party and the acoustically fed back received voice of the other party. The large time delay causes the acoustic feedback to be perceived as an echo which makes it difficult for the other party to communicate with the user of the hands free set. Therefore, the hands free telephone sets processing digital signals need less acoustic feedback than can be tolerated in the hands free telephone sets processing analog signals.

In a typical hands free telephone set, the loudspeaker and the microphone are connected through appropriate amplifying circuitry to a transmission path which is communicatively connected to a public switch telephone network. A voice signal received from the transmission path is directed through an amplifier to the loudspeaker which transforms the signal from electrical to acoustical energy and permits the signal to be heard at a distance from the loudspeaker. A voice signal received by the microphone is typically amplified by an amplifier and transmitted to another telephone set participating in the conversation through the transmission path provided by the public switched telephone network.

Because the microphone in many hands free telephone sets is located in proximity to the loudspeaker, the signal received over the loudspeaker is often acoustically coupled back into the microphone and returned along the transmission path to the other telephone set. The user of the telephone set can often hear the return of the acoustically coupled signal, which sounds similar to an echo, and is distracted and annoyed thereby.

Many telephone systems utilize a single line for the transmission of telephone signals in both directions. In each single line system, the acoustically cross-coupled signal which is fed back into the microphone at the hands free instrument will couple through the single transmission line or through a hybrid circuit which connects the telephone set to the single line back to the loudspeaker of the hands free telephone set. If the amplification of the received and transmitted signals is of a sufficiently high level, the acoustically cross-coupled signal which is subsequently electrically cross-coupled on the transmission path can result in an increasing amplitude signal running around the acoustic and electrical coupling means until the amplifiers of the hands-free telephone set are saturated. Such a signal often causes an extremely annoying squeal in the telephone set.

The acoustically cross-coupled signal is also annoying because it may mix and interfere with any signals originating at the hands free telephone set. The recipient of such a mixed signal may have considerable difficulty in separating the original signal from the acoustically cross-coupled signal, both of which are received by the same microphone input.

There have been a number of methods and circuits proposed to reduce and/or eliminate acoustic and electrical coupling in hands free telephone sets. In one known method a hands free telephone set is equipped with an input detection device which operates to disable the transmission sections of the telephone set when a signal is received from the transmission path. Accordingly, when the user of the telephone set hears a communication from the party with which he is speaking, he is unable to respond until the other party ceases speaking.

Similarly, in other known systems, the input detection device is also used to control the receiver circuitry, so that when a local input is received through the microphone of the telephone set, the receiver circuitry is disabled. Accordingly, in such systems it is a frequent occurrence that the user of a hands-free telephone set is unable to hear from the other telephone set while he is speaking.

While the technique of disabling one of the circuits in a telephone set may be effective in eliminating or reducing feedback, such a system is generally disadvantaged by the fact that, at any one time, only one party to the communication can transmit a signal which is received by the party, i.e., one party cannot interrupt the other party until the other party has finished his communication or if one party begins to communicate, he can no longer hear the other party.

A refinement to systems which simply disconnect one or both of the signal paths are systems in which the transmission path is disabled only upon receipt of a signal of predetermined strength on the receive path. While such devices are generally improvements of the simple disabling devices, they are, nonetheless, limited by their disabling of one of the communication paths.

It is also known to remove or eliminate echo signals from telephone transmissions by use of digital echo cancellers, sometimes called "adaptive filters". In such systems the signal being transmitted by the telephone set is compared with the signal received from the transmission line within a predetermined time period and if the two signals are substantially similar as determined by a digital filter, the received signal is subtracted from the signal to be transmitted prior to amplification and transmission. While echo cancellers reduce the echo/feedback problems in the handsfree telephone sets, they are generally complex electronic circuits and often require a relatively long period of time for the digital filter to converge and become effective.

Other systems disclosed, employ variable amplification circuitry in the communication receive path of the telephone set. In such known systems, often a measure of the signal level in the transmit path of the telephone set is taken and used to control the gain of the receive path amplifier in an inverse relationship, i.e., when a high volume signal is transmitted by the telephone set, the amplifier circuit in the receive circuitry is adjusted to decrease the amount of amplification applied to the signals received at the telephone set. In such systems, however, the gain of the amplifier on the receive circuits in the telephone set depends in large part upon an independent signal, the signal to be transmitted, and the receive signal may be unduly suppressed.

Accordingly, there is a need for an audio signal processor and method therefor for substantially reducing audio feedback in a communication unit.

SUMMARY OF THE INVENTION

In accordance with the present invention, the foregoing need is substantially met by an audio signal processor and method therefor for substantially reducing audio feedback in a communication unit. According to one embodiment of the present invention, the audio signal processor comprises a first signal path having a first audio signal and a second signal path having a second audio signal, wherein at least a portion of the first audio signal is coupled to the second signal path to produce a feedback audio signal on the second signal path. An attenuator, coupled to the second signal path, attenuates the second audio signal responsive to a measure of the feedback audio signal.

According to a feature of the preferred embodiment of the present invention, the measure of the feedback audio signal further comprises a signal to noise ratio measurement of the feedback audio signal.

According to a feature of the preferred embodiment of the present invention, the second signal path is coupled to receive a third audio signal, wherein the attenuator for attenuating the second audio signal is further responsive to at least one of the first audio signal and the third audio signal.

According to a feature of the preferred embodiment of the present invention, the first and second signal paths further comprise forward and reverse signal paths, respectively.

According to a feature of an alternate embodiment of the present invention, the first and second signal paths further comprise reverse and forward signal paths, respectively.

DETAILED DESCRIPTION OF A PREFERRED EMBODIMENT

Figure 1:
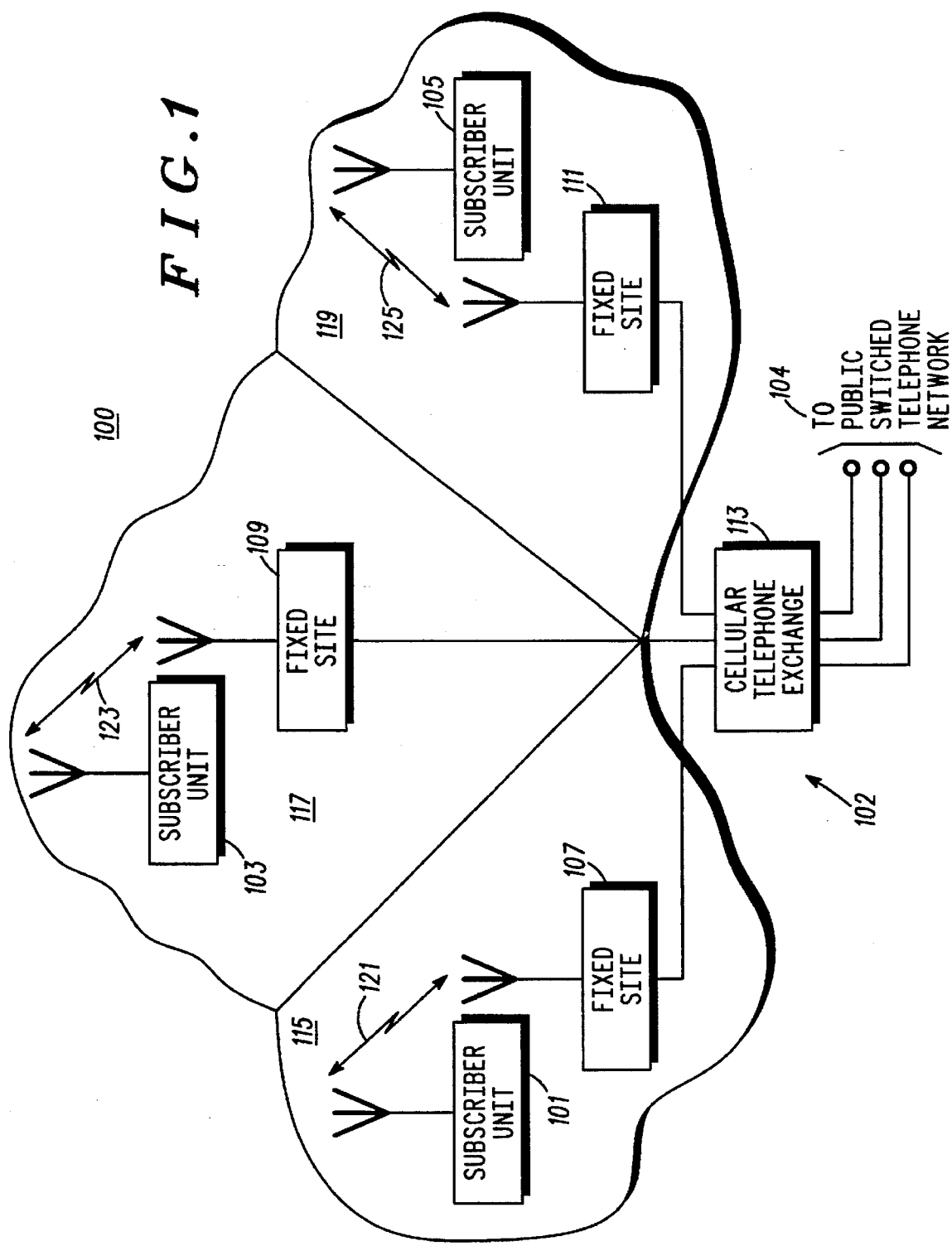
FIG. 1 illustrates a block diagram of a communication system, in accordance with the present invention.

FIG. 1 illustrates a block diagram of a communication system 100, in accordance with the present invention. The communication system 100 of FIG. 1 generally comprises a wireless communication system 102 coupled to a wireline communication system 104. The wireless communication system 102 generally comprises a switch 113 coupled to a plurality of fixed sites 107, 109 and 111, and a plurality of wireless communication devices 101, 103 and 105. The communication system 100 provides communication between the wireline communication system 104 and one or more wireless communication devices 101, 103 and 105.

In the preferred embodiment of the present invention, the wireless communication system 102 is a radiotelephone system, and in particular, a cellular radiotelephone system. In the preferred embodiment of the present invention, the cellular radiotelephone system 102 is specified in the EIA/TIA Interim Standard, Cellular System Dual-Mode Mobile Station-Base Station Compatibility Standard, IS-54, Revision B, April 1992, published and available from Telecommunications Industry Association, Engineering Department, 2001 Pennsylvania Avenue N.W., Washington, D.C. 20006. Alternatively, the wireless communication system 102 may comprise a cordless radiotelephone system, a satellite communication system, a paging communication system, a trunked radio communication system or a personal communication system (PCS).

In the preferred embodiment of the present invention, the wireless communication devices 101, 103 and 105 are radiotelephone subscriber units 101, 103 and 105, and in particular, cellular radiotelephone subscriber units. Alternatively, the wireless communication devices 101, 103 and 105 may comprise cordless radiotelephones, pagers, two-way radios, personal data assistants, and personal notebooks. In the preferred embodiment of the present invention, the wireless communication devices 101, 103 and 105 are portable devices that operate in a wireless communication system 102 to advantageously provide users of the devices 101, 103 and 105 with portable communications. Alternatively, the wireless communication devices 101, 103 and 105 may be mobile devices, such as those used in cars and planes, that operate in a wireless communication system 102 to advantageously provide users of the devices 101, 103 and 105 with communications while traveling in transportation vehicles.

In the preferred embodiment of the present invention, the wireless communication devices 101, 103 and 105 communicate with one of the plurality of fixed sites 107, 109 and 111 via electromagnetic signals 121, 123 and 125, respectively, such as those in the radio frequency (RF) range, for example. In the preferred embodiment, the radio frequency signals 121, 123 and 125 are radiotelephone calls transmitted and received by the radiotelephones 101, 103 and 105. In the preferred embodiment of the present invention, each wireless communication device 101, 103 and 105 has a unique telephone directory number, corresponding to the telephone number which would be dialed in the public switched telephone network 104, to access the communications link which would couple the wireless communication device 101, 103 and 105 to the appropriate telephone line. The wireless communication devices 101, 103 and 105 may communicate control signals as well as voice signals, data signals or both voice and data signals. The format of the electromagnetic signals 121, 123 and 125 communicated between the wireless communication devices and the fixed sites 107, 109 and 111 may be either analog or digital. Alternatively, the electromagnetic signals 121, 123 and 125 may be infra-red signals.

In the preferred embodiment of the present invention, the fixed sites 107, 109 and 111 are land-base stations. The wireless communication devices 101, 103 and 105 communicate with the fixed sites 107, 109 and 111, which in turn, couple two-way communication through the switch 113. In the preferred embodiment of the present invention, the fixed sites 107, 109 and 111 provide communications, throughout discrete radio coverage areas 115, 117, and 119, respectively, enabling the wireless communication devices 101, 103 and 105 to communicate with the wireless communication system 102 over a wide geographic area. Alternatively, the fixed sites 107, 109 and 111 may comprise satellites orbiting about the earth to communicate either directly with the wireless communication devices 101, 103 and 105 or through other land-base stations.

In the preferred embodiment of the present invention, the switch 113 is a telephone exchange, and in particular, a cellular telephone exchange. Alternatively, the switch 113 may be a cordless telephone exchange such as used in PCS systems. In the preferred embodiment of the present invention, the switch 113 performs the operation of call placement, control, and interconnection with the wireline communication network 104. In the preferred embodiment of the present invention, the wireline communication network 104 is a public switched telephone network, as is well known in the art.

Figure 2:
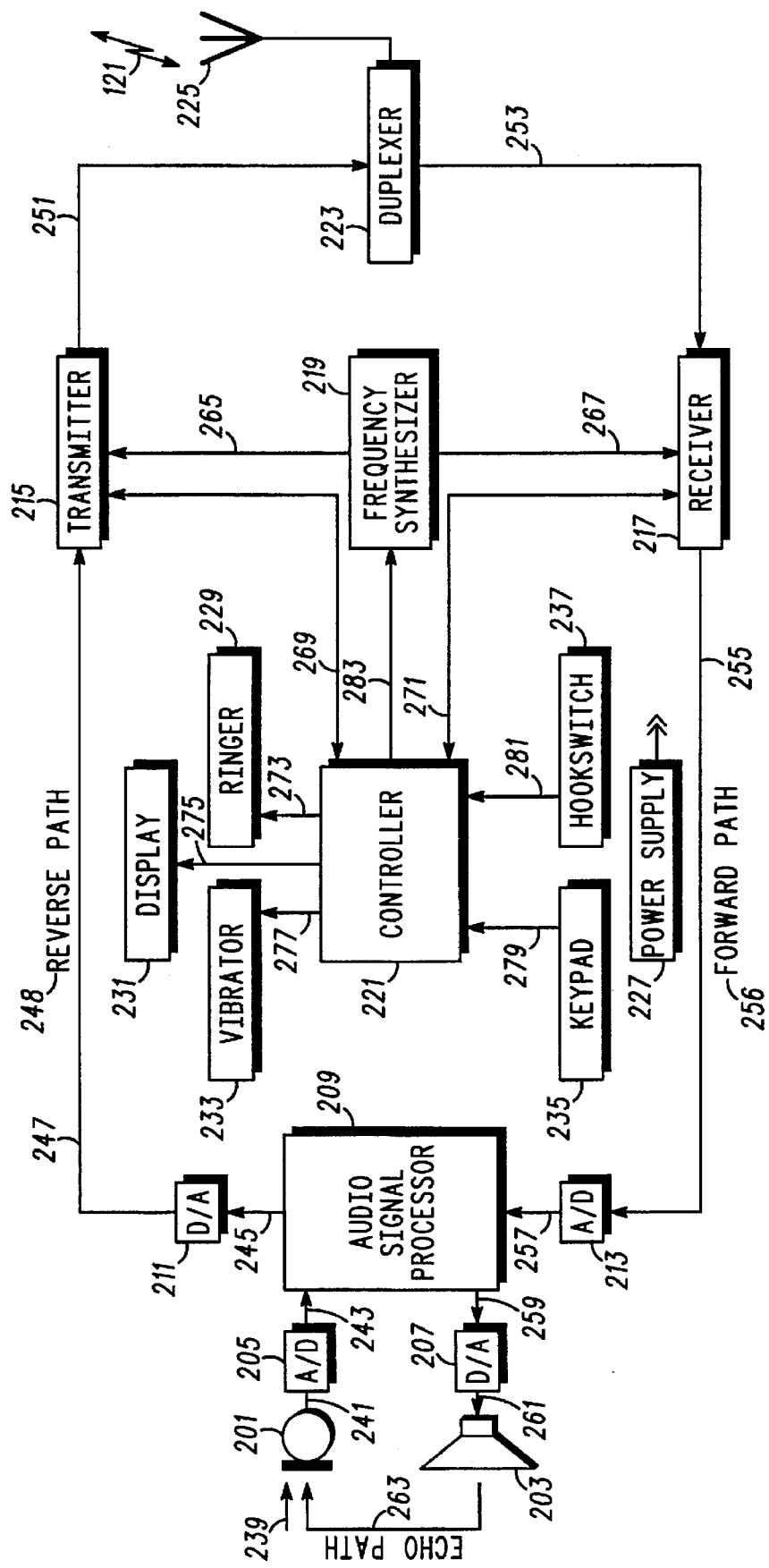
FIG. 2 illustrates a block diagram of a radiotelephone subscriber unit of FIG. 1, in accordance with the present invention.

FIG. 2 illustrates a block diagram of a radiotelephone subscriber unit 101 of FIG. 1, in accordance with the present invention. The radiotelephone 101 generally comprises a microphone 201, a loudspeaker 203, a first analog to digital (A/D) converter 205, a first digital to analog (D/A) converter 207, an audio processor 209, a second D/A converter 211, a second A/D converter 213, a transmitter 215, a receiver 217, a frequency synthesizer 219, a controller 221, a duplexer 223, an antenna 225, a power supply 227, a finger 229, a display 231, a vibrator 233, a keypad 235, and a hookswitch 237. With the exception of the audio processor 209, all the elements shown in FIG. 2 are individually well known in the art, and hence no additional description need be provided here except as necessary to facilitate the understanding of the present invention. In the preferred embodiment of the present invention, the radiotelephone subscriber unit 101 is specified in the EIA/TIA Interim Standard, Cellular System DUAL-MODE MOBILE STATION-BASE STATION COMPATIBILITY STANDARD, IS-54, Revision B, April 1992, published and available from Telecommunications Industry Association, Engineering Department, 2001 Pennsylvania Avenue N.W., Washington, D.C. 20006.

The following description generally describes the operation of a hands-free radiotelephone set, in accordance with the present invention. The microphone 201 is coupled to receive an acoustic signal 239, typically a voice signal, generated by a user, and operative to produce an analog electrical signal at line 241. The first A/D converter 205 is operative to receive the analog electrical signal at line 241 and operative to produce a digitized electrical signal of the user's voice at line 243. The audio processor 209 is coupled to receive the user's digitized voice signal at line 243, and operative to produce a processed digitized voice signal at line 245. The D/A converter 211 is coupled to receive the processed digitized voice signal at line 245 and operative to produce a processed analog voice signal at line 247. The transmitter 215 is coupled to receive the processed analog voice signal at line 247, and operative to produce a transmitted signal at line 251. The duplexer 223 is coupled to receive the transmitted signal at line 251 and operative to radiate the transmitted signal 251 from the antenna 225. A signal path through the hands-free radiotelephone set 101 including the microphone 201, the converters 205 and 211, the audio processor 209, the transmitter 215, the duplexer 223 and the antenna 225 is defined as the "reverse path" 248 through which the acoustic signal 239 is transmitted by the antenna 225.

The duplexer 223 is also coupled to receive a signal 121 via the antenna 225 and operative to produce a filtered receive signal at line 253. The receiver 217 is coupled to receive the filtered receive signal at line 253 and operative to produce a receive signal at line 255. The A/D converter 213 is coupled to receive the receive signal in analog form, and operative to produce a digitized receive signal at line 257. The audio processor 209 is coupled to receive the digitized receive signal at line 257 and operative to produce a processed digitized receive signal at line 259. The D/A converter 207 is coupled to receive the processed digitized receive signal at line 259 and operative to produce a processed analog receive signal at line 261. The loudspeaker 203 is coupled to receive the processed analog receive signal at line 261, and operative to produce an acoustic output signal 263, representing the calling party's voice. A signal path including the antenna 225, the duplexer 223, the receiver 217, the converters 207 and 213, the audio processor 209 and the speaker 203, defines a "forward path" 256 originating with the signal 121 received by the antenna 225 and ending with the acoustic signal 263 produced by the loudspeaker 203.

The controller 221 is operative to produce a frequency control signal 283. The frequency synthesizer 219 is operative to receive the frequency control signal at line 283, and operative to produce a transmitter reference frequency signal at line 265 and a receiver reference frequency signal at line 267. Transmitter control signals at line 269 are also coupled between the controller 221 and the transmitter 215. Receiver control signals at line 271 are also coupled between the controller 221 and the receiver 217. The controller 221 is also operative to control the ringer 229, the display 231 and the vibrator 233 via control signals at lines 273,275 and 277, respectively, as is well known in the art. The controller 221 is also coupled to receive control signals via lines 279 and 281 from the keypad 235 and the hookswitch 237, respectively, as is well known in the art. The power supply 227 supplies power to operate the radiotelephone 101.

The radiotelephone 101 of FIG. 2 includes the essential elements for both a hands free radiotelephone set and a radiotelephone hand set. At minimum the hands free radiotelephone set needs the elements listed with reference to the forward and reverse signal paths as well as the frequency synthesizer 219, the controller 221 and the power supply 227. In a hands-free radiotelephone set, the ringer 229, the display 231, and vibrator 233, the keypad 235 and the hookswitch 237 are optional. In a hands-free radiotelephone set such input and output information may be similarly accomplished using voice recognition, for example. A radiotelephone hand set typically comprises substantially all of the elements illustrated in FIG. 2, as is well known in the art.

As previously mentioned, a well known problem associated with hands free radiotelephone units is acoustic feedback. Because the microphone 201 in many hands free radiotelephone sets is located in proximity to the loudspeaker 203, the acoustic signal 263, produced by the loudspeaker 203, is often acoustically coupled back into the microphone 201 and returned along the reverse path to the other telephone set. The user of the other telephone set can often hear the return of the acoustically coupled signal 263, which sounds similar to an echo, and is distracted and annoyed thereby.

Alternatively, the present invention may be applied to the forward signal path in a similar manner to that described for the reverse path. In this case, the attenuator 307 is controlled in a similar manner to the attenuator 305 on the reverse path.

The audio feedback is typically acoustic, but may alternatively be mechanical feedback, such as those experienced when the microphone and the loudspeaker are in the same housing, or electrical feedback.

Audio Process

Figure 3:
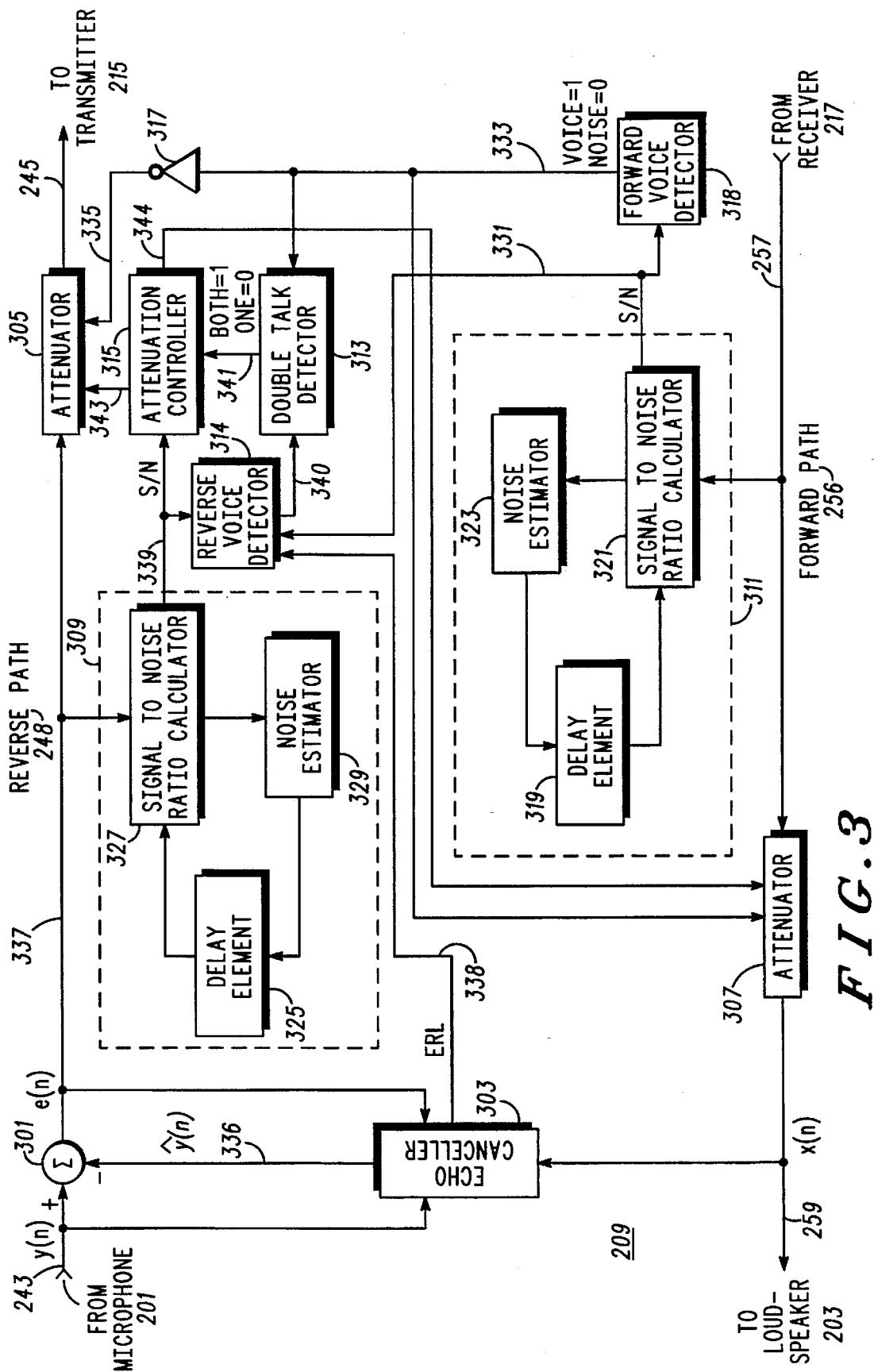
FIG. 3 illustrates a block diagram of an audio processor of the radiotelephone subscriber unit of FIG. 2, in accordance with a first embodiment of the present invention.

FIG. 3 illustrates a block diagram of an audio processor 209 of the radiotelephone subscriber unit 101 of FIG. 2, in accordance with a first embodiment of the present invention. The audio processor 209 generally comprises a summer 301, an echo canceller 303, a reverse path attenuator 305, a forward path attenuator 307, a reverse voice processor 309, a forward voice processor 311, a reverse voice detector 314, a forward voice detector 318, a double talk detector 313, an attenuation controller 315, and an inverter 317. The forward voice processor 311 further comprises a delay element 319, a signal to noise ratio calculator 321 and a noise estimator 323. Likewise, the reverse voice processor 309 further comprises a delay element 325, a signal to noise ratio calculator 327 and a noise estimator 329.

The attenuator 307, in the forward path, is coupled to receive the digitized receive signal at line 257 and operative to produce the processed digital signal, x(n), at line 259. In the diagram, and throughout this report, x(n) will refer to the forward speech which has been altered by the attenuator 307. In the context of the echo canceller, x(n) is also referred to as the reference signal. The forward voice processor 311 is also coupled to receive the digitized received signal at line 257, and operative to produce a signal to noise ratio (S/N) signal at line 331 and a voice detect signal at line 333. The S/N signal at line 331 is indicative of the signal to noise ratio of the digitized received signal at line 257. The forward voice detector 318 is coupled to receive the signal to noise ratio (S/N) signal at line 331 and is operative to produce a voice detect signal at line 333 which is indicative of the presence of either voice (binary one) or noise (binary zero) at line 257. The attenuator 307 is disabled via the voice detect signal at line 333 responsive to voice being present at line 257, and enabled responsive to the voice detect signal at line 333 when noise is present at line 257. Thus, the forward path freely passes digitized voice signals at line 257 to the loudspeaker 203 and attenuates digitized noise signals at line 257.

The inverter 317 is coupled to receive the voice detect signal at line 333 and operative to produce an inverted voice detect signal at line 335. The attenuator 305 is coupled to receive the inverted voice detect signal at line 335. Thus, when voice signals are present at line 257 the attenuator 305 is enabled to attenuate any feedback signal present at line 243.

The echo canceller 303 and the summer 301 also aid in reducing feedback signals at line 243. The echo canceller 303 is coupled to receive the processed digitized receive signal at line 259, the digital input signal, y(n), at line 243, and an error signal, e(n), at line 337, and operative to produce an estimate of the signal y(n) at line 336. The signal y(n) refers to the digitized mobile speech at line 239 combined with the digitized feedback signal at line 263. The signal e(n) refers to the echo cancelled speech at line 337 (also referred to as the error signal of the echo canceller). The echo canceller 303 and the process performed thereby will be described in more detail below with reference to FIGS. 5–8.

The reverse voice processor 309 is coupled to receive signals at line 337 on the reverse path and operative to produce a signal to noise ratio signal at line 339. The signal to noise ratio signal at line 339 is indicative to the signal to noise ratio of the signals at line 337. The reverse voice detector 314 is coupled to receive the signal to noise ratio signals at lines 331 and 339 as well as the echo return loss signal at line 338 and is operative to produce a voice detect signal at line 340 which is indicative of the presence of either voice (binary one) or noise (binary zero) at line 337. The double talk detector 313 is operative to receive the voice detect signals at lines 340 and 333. The purpose of the double talk detector 313 is to detect when both parties are talking at the same time. The double talk detector 313 produces an output signal at line 341 having a first state (logic one) indicating that voice signals are present at lines 337 and 257, and a second state (logic zero) indicating that voice is present on only one or none of the lines 337 and 257.

The attenuation controller 315 is coupled to receive the double talk detect signal at line 341 and the signal to noise ratio signal at line 339, and operative to produce a variable attenuation signal at line 343. The attenuator 305, in addition to being responsive to the inverted voice detect signal at line 335, is also responsive to the variable attenuation signal at line 343. Further details of the attenuation calculator 315 will be described with reference to FIG. 14 below.

Figure 3A:
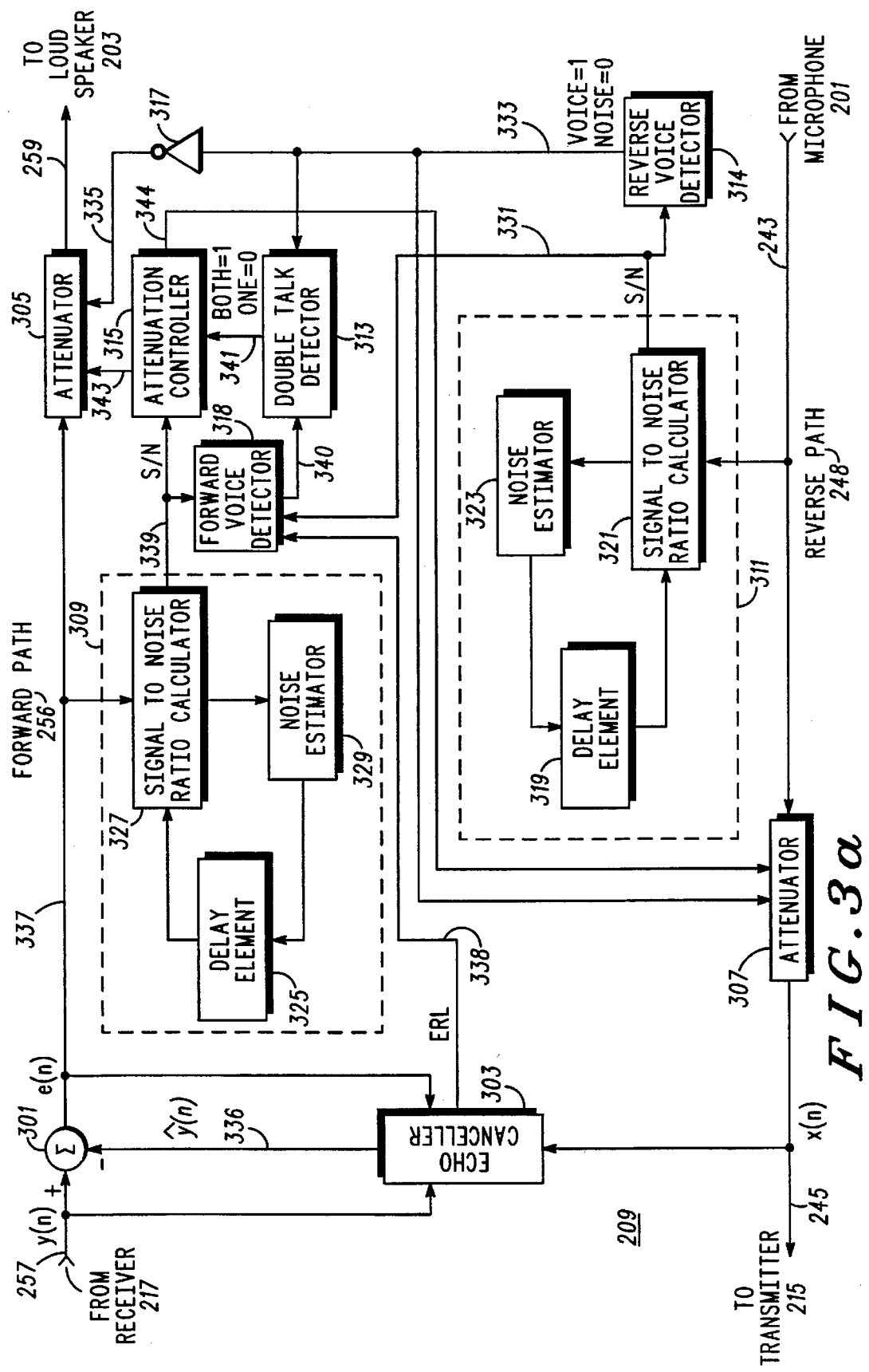
FIG. 3a illustrates a block diagram of an audio processor of the radiotelephone subscriber unit of FIG. 2, in accordance with a second embodiment of the present invention.

FIG. 3a illustrates a block diagram of an audio processor of the radiotelephone subscriber unit of FIG. 2, in accordance with a second embodiment of the present invention. In FIG. 3a, the attenuation controller 315 controls the attenuator 305 on the forward path 256 which couples the receiver 217 to the loudspeaker 203.

Figure 4:
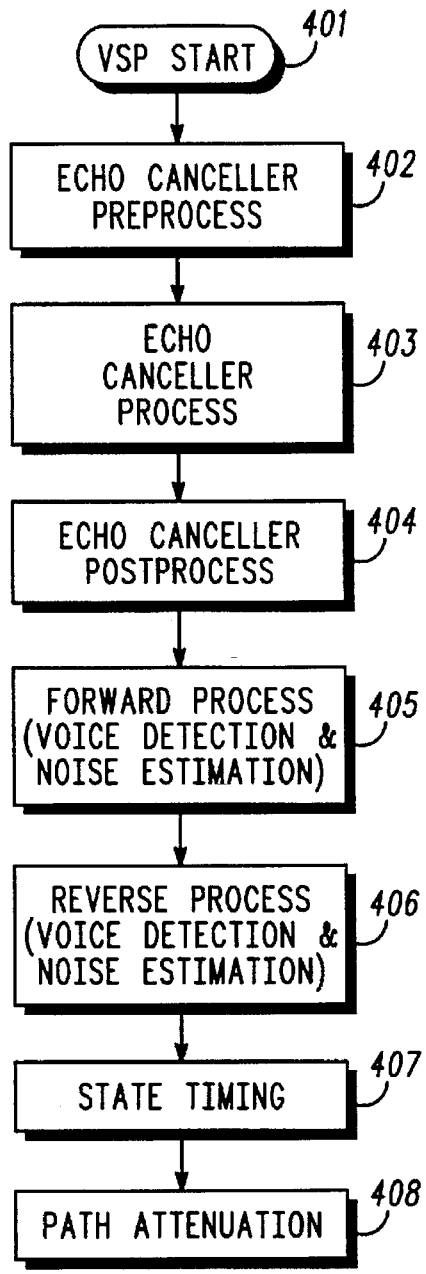
FIG. 4 illustrates a process flow diagram performed by the audio processor of FIG. 3, in accordance with the present invention.

FIG. 4 illustrates a process flow diagram performed by the audio processor of FIG. 3, in accordance with the present invention. The process begins at step 401 and proceeds sequentially through step 408 as follows. At step 402 the echo canceller preprocess is performed, and will be described in further detail with reference to FIG. 6. At step 403 the echo canceller process is performed, and will be described in further detail with reference to FIGS. 5 and 7. At step 404 the echo canceller postprocess is perfomed, and will be described in further detail with reference to FIG. 8. At step 405, the forward process, voice detection and noise estimation, is performed, and will be described in further detail with reference to FIGS. 9, 10, 11 and 13. At step 406, the reverse process, voice detection and noise estimation, is perfomed, and will be described with reference to the forward process in FIGS. 9, 10, 11 and 13. At step 407, state timing is performed, and will be described in further detail with reference to FIG. 12. At step 408, path attenuation is performed, and will be described in further detail with reference to FIGS. 14–17.

Figure 5:
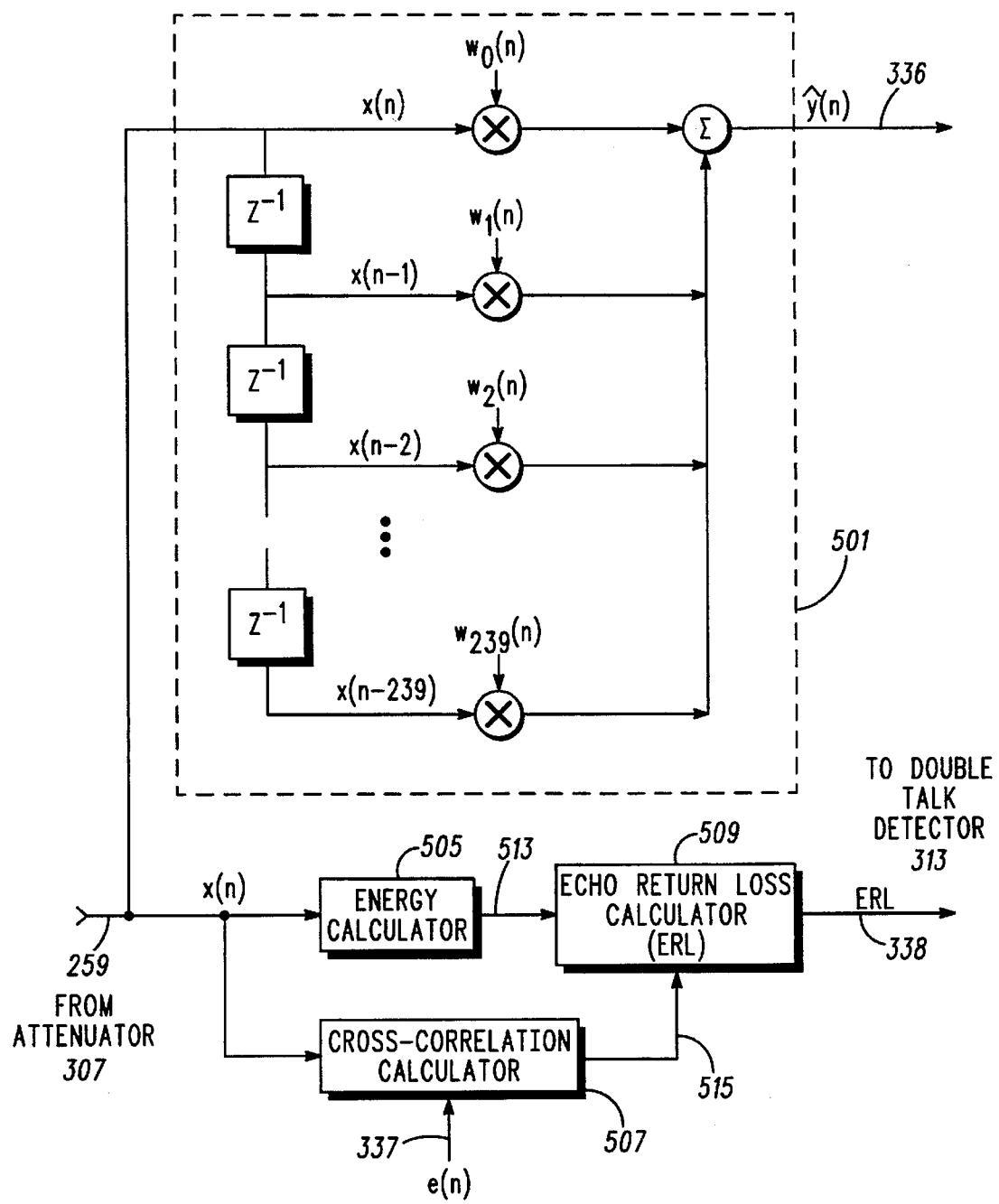
FIG. 5 illustrates a block diagram of the echo canceller of the audio processor of FIG. 3, in accordance with the present invention.

FIG. 5 illustrates a block diagram of the echo canceller 303 of the audio processor 209 of FIG. 3, in accordance with the present invention. The echo canceller 303 generally comprises an adaptive transversal filter 501, an energy calculator 505, a cross-correlation calculator 507, and an echo return loss calculator 509.

The adaptive transversal filter 501 is coupled to receive the processed digital signal, x(n), at line 259 and is operative to produce an estimate of the signal y(n) at line 336. The adaptive transversal filter 501 will be described in further detail with reference to FIG. 7. The energy calculator 505 is also coupled to receive the processed digital signal, x(n), at line 259 and is operative to produce an energy signal 513. The cross-correlation calculator 507 is coupled to receive the error signal, e(n), at line 337 and the processed digital signal, x(n), at line 259 and is operative to produce a measure of correlation 515 between these two. The cross-correlation calculator 507 will be described in further detail with reference to FIG. 8. The echo return loss calculator 509 is also coupled to receive the cross-correlation signal 515 and the energy signal 513 and is operative to produce an echo return loss signal 338. The echo return loss calculator 509 will be described in further detail with reference to FIG. 8.

Echo Canceller Preprocess

Figure 6:
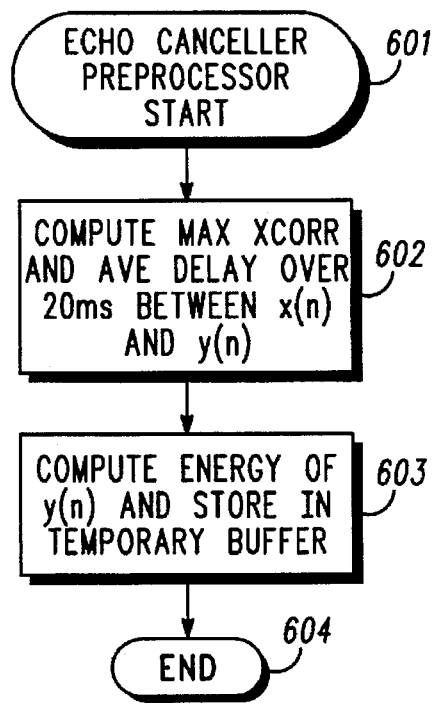
FIG. 6 illustrates a process flow diagram performed by the echo canceller preprocess of the process flow diagram performed by the audio processor of FIG. 4, in accordance with the present invention.

FIG. 6 illustrates a process flow diagram performed by the echo canceller preprocess of the process flow diagram performed by the audio processor of FIG. 4, in accordance with the present invention. The echo canceller preprocessor computes parameters on the speech before echo cancellation is performed. These parameters are used later to control various elements of the hand free system.

At step 601, the echo canceller preprocessor begins. At step 602 the echo canceller preprocessor computes the maximum cross-correlation between x(n) and y(n) over a twenty ms window. At step 603, the echo canceller preprocessor computes the energy of y(n) and stores a copy of it into a temporary buffer. At step 604 the echo canceller preprocessor ends.

Max Cross-Correlation

The first task of the preprocessor is to compute the maximum cross-correlation between x(n) and y(n) over a 20 ms window.

$$XC(k) = \sum_{n=0}^{159} x(n-k)y(n)$$

$$XC_{in}(k) = \max\{XC(k)|_{k=0}^{159}\}$$

This calculates two parameters: the average delay time for the current frame echo (this is k when XC(k) is at maximum), and how correlated the forward signal is to the mobile signal (this is the value $XC_{in}(k)$). We will use both of these in the echo canceller postprocessor to determine the echo canceller's performance.

Energy of y(n)

The last computation of the preprocessor is the energy value of the mobile signal before echo cancellation, y(n). While the echo canceller preprocessor computes this energy, it stores a copy of it into a temporary buffer. During double talk, the echo canceller can wander away from the optimum solution and can make the output have greater energy than its input. The echo canceller preprocessor stores a copy of the energy into a temporary buffer so that, if the echo canceller inadvertently adds more energy to the reverse signal, the echo canceller output will be discarded and replaced with the original mobile speech. The energy is calculated over one speech frame (160 samples) in the standard way, and is given below.

$$E = \sum_{n=0}^{159} y^2(n)$$

Echo Cancellation Process

Figure 7:
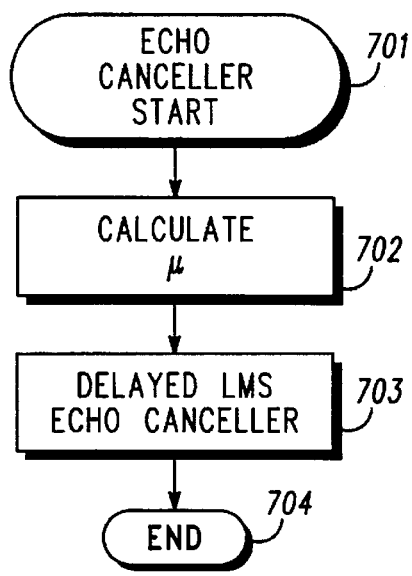
FIG. 7 illustrates a process flow diagram performed by the echo canceller of the process flow diagram performed by the audio processor of FIG. 4, in accordance with the present invention.

FIG. 7 illustrates a process flow diagram performed by the echo canceller of the process flow diagram performed by the audio processor of FIG. 4, in accordance with the present invention. At step 701 the echo canceller process starts. At step 702, the echo canceller calculates μ. At step 703, the echo canceller enables a delayed least mean squares (LMS) algorithm. At step 704, the echo canceller process ends.

The echo canceller provides loss in the speaker to microphone feedback path of the mobile side. A standard delayed LMS algorithm is used for the echo canceller because of its simplicity. There are two parameters that need to be determined by the echo canceller: the number of taps and the adaptation rate.

Number of Taps

A typical installation of a mobile radio telephone has an acoustic echo delay of less than 30 ms. With this in mind, the echo canceller was designed with 240 taps which is capable of cancelling echoes out to 30 ms.

The update equations for the delayed LMS adaptive filter are as follows.

$$\hat{y}(n) = \sum_{k=0}^{239} w_k(n)x(n)$$

$$e(n) = y(n) - \hat{y}(n)$$
$$w_k(n+1) = w_k(n) + \mu e(n-1)x(n-1-k)$$

Adaptation Rate

The adaptation constant $\mu$ (sometimes referred to as the step size parameter) has control of how fast the echo canceller will adapt to its environment. It also controls the amount of error $e(n)$ that is generated when the optimum solution is reached. This is called misadjustment. Equations govern $\mu$ to maintain stability and convergence of the filter. In the preferred embodiment, a conservative upper bound to $\mu$ is chosen.

$$0 < \mu < \frac{2}{\text{total input energy}}$$

where $$\text{total input energy} = \#\text{Taps} \cdot \frac{1}{N} \sum_{n=0}^{N} x^2(n)$$

Note that it is common to have 2 $\mu$ in the update equations. I have chosen to include this 2 with the definition of $\mu$.

The first step in the echo cancellation process is to calculate The equation used is as follows.

$$\mu = \frac{2\alpha}{\frac{240}{240+160} \sum_{n=-239}^{160} x^2(n)}$$

Where the #Taps=240, # samples in the speech frame=160 and alpha=0.25. $\mu$ is calculated once per speech frame. Note that the energy equation in the $\mu$ equation contains all the speech samples of the current speech frame and the echo filter states. Due to finite precision, the $\mu$ equation above needs to have a ceiling (otherwise $\mu$ could get uncontrollably large for very low levels of input). A good practical value for the ceiling was found to be sixteen. Any value larger than this made the echo canceller unstable.

Echo Canceller Postprocess

Figure 8:
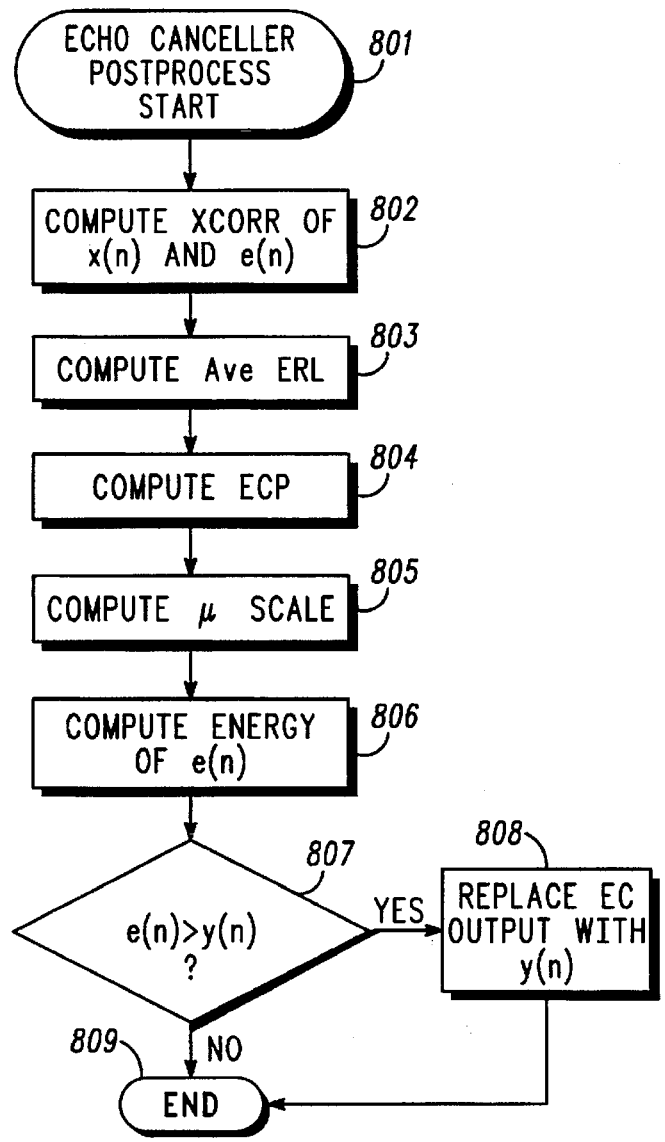
FIG. 8 illustrates a process flow diagram performed by the echo canceller postprocess of the process flow diagram performed by the audio processor of FIG. 4, in accordance with the present invention.

FIG. 8 illustrates a process flow diagram performed by the echo canceller postprocess of the process flow diagram performed by the audio processor of FIG. 4, in accordance with the present invention. The echo canceller postprocessor computes parameters on the speech after echo cancellation is done. The echo canceller postprocessor's main function is to determine the performance of the echo canceller so that the adaptation rate, $\mu$, can be scaled and also to decide if the output of the echo canceller is worth using.

At step 801, the echo canceller postprocess begins. At step 802, the echo canceller computes the cross-correlation of x(n) and e(n). At step 803, the echo canceller computes an average echo return loss (ERL). At step 804, the echo canceller computes echo canceller performance (ECP). At step 805, the echo canceller computes a $\mu$ scale. At step 806, the echo canceller computes the energy of small e(n). At step 807, the echo canceller determines whether the energy of e(n) is greater than the energy of y(n). If the determination is positive, then at step 808, the output of the echo canceller is replaced with y(n) then ends at step 809. However, if the determination, at step 807, is negative, the echo canceller postprocess ends at step 809.

Echo Canceller Performance (ECP)

The echo canceller performance (ECP) is calculated by dividing the cross-correlation of x(n-k) e(n) by the cross-correlation of x(n-k) y(n). Note that the latter term and k were calculated in the echo canceller preprocessor. Therefore, to calculate the ECP, we need to compute:

$$XC_{out}(k) = \sum_{n=0}^{159} x(n-k)e(n)$$

$$ECP = \frac{XC_{out}(k)}{XC_{in}(k)}$$

This approach to calculating the ECP has the advantage of being less susceptible to the noise and talking of the mobile talker (this assumes little to no correlation between the mobile and landside speech, which is not always true).

$\mu$ Scaling

The equation for $\mu$ in the echo canceller was designed to be rather aggressive. It is done this way to achieve rapid adaptation during the initial stages of change. After it reaches a close solution, the echo canceller postprocess scales the calculated $\mu$ down relative to the performance of the echo canceller performance (ECP). The amount of scaling is linear to the loss in dB achieved by the echo canceller, as illustrated in the table below. Scaling $\mu$ reduces the misadjustment and allows the echo canceller to successfully reach the optimum solution.

| ECP Loss in dB | Scale Value |
| --- | --- |
| 0 to 5 | 1 |
| 6 to 10 | 0.5 |
| 11 to 15 | 0.25 |
| 16 to 20 | 0.125 |
| 21 to 25 | 0.0625 |

Forward Speech Process

Figure 9:
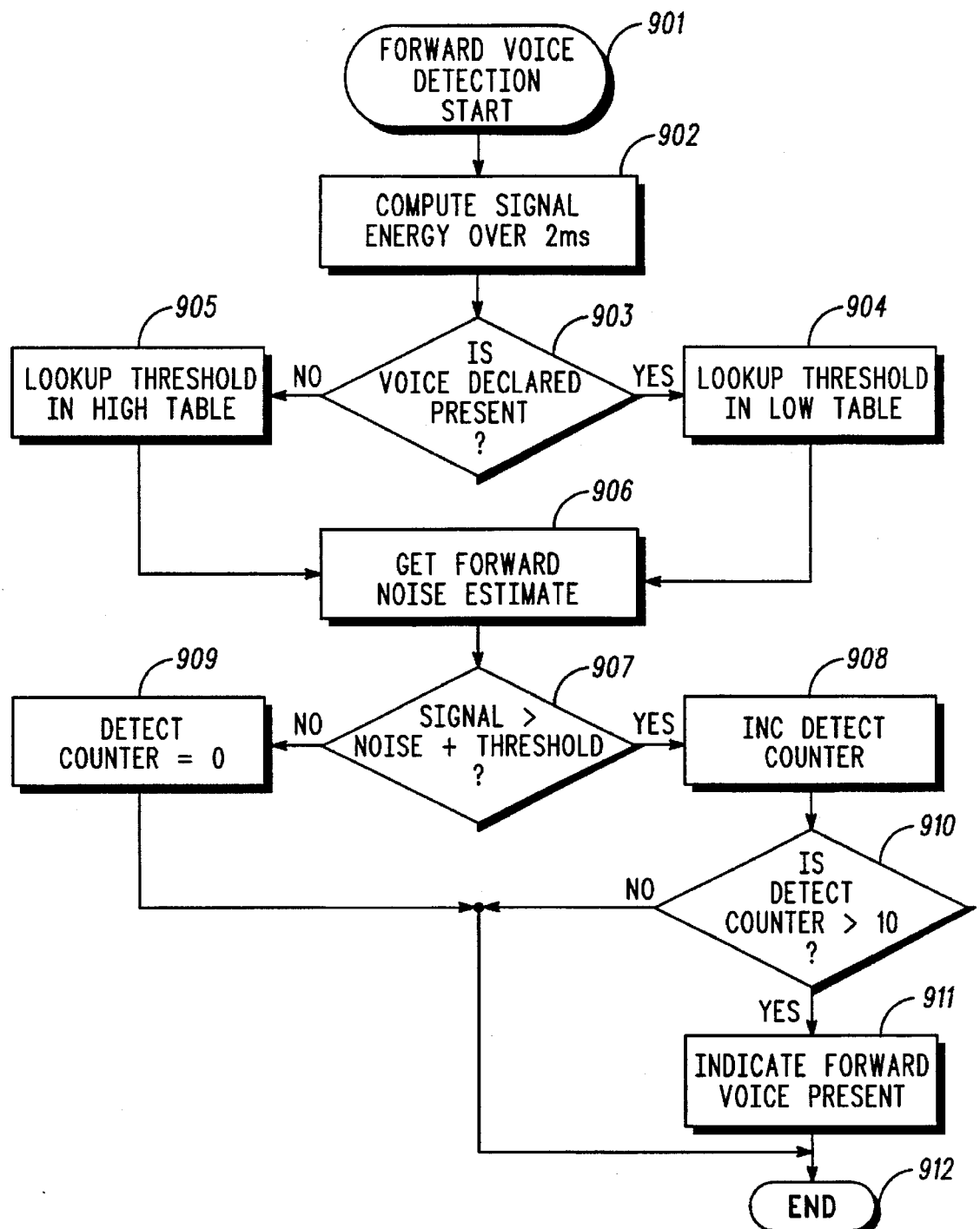
FIG. 9 illustrates a process flow diagram performed by the forward voice detection and noise estimation process of the process flow diagram performed by the audio processor of FIG. 4, in accordance with the present invention.

FIG. 9 illustrates a process flow diagram performed by the forward voice detection and noise estimation process of the process flow diagram performed by the audio processor of FIG. 4, in accordance with the present invention. At step 901, the forward voice detection process begins. At step 902, the signal energy of a signal at line 257 is computed over 2 ms. At step 903, a determination is made if voice is present at line 257. If the determination is positive, at step 903, a threshold value is looked up in a low table, at step 904. If the determination at step 903 is negative, a threshold is looked up in a high table at step 905. At step 906, a forward noise estimate is determined using the threshold derived from either the low table at step 904 or the high table at step 905. At step 907 a determination is made whether the signal energy at line 257 is greater than the noise energy at line 257 plus the threshold value. If the determination at step 907 is positive a detect counter is incremented at step 908. If the determination at step 907 is negative, the detect counter is set to zero at step 909 then ends tat step 912. At step 910 a determination is made whether the detect counter is greater than ten. If the determination at step 910 is positive, the voice detection process indicates that forward voice is present at step 911 then ends at step 912. If the determination at step 910 is negative, the forward voice detection process ends at step 912.

The forward speech is unique in that it can contain speech from either a landside talker or from a mobile talker (mobile to mobile conversation). The forward speech process is broken down into two subprocesses: voice detection and noise estimation.

Voice Detection Process

The requirements for voice detection are completely different for a landside talker than for a mobile talker. The biggest difference between them is signal-to-noise ratio. The landside talker will typically have a low background noise and a very strong voiced signal because the mouth piece is up near the mouth. This also poses another problem of rejecting noises made from the mouth, i.e., lip smacks, and breathing. The mobile talker, on the other hand, will experience a low signal-to-noise ratio because the open air microphone is subject to all of the surrounding noises, such as road noise, engine noise, movement inside the car, and the talker is typically one to two feet away from the microphone. These differences in requirements call for a voice detector which can adapt to the changing environment.

The voice detection decision equation itself is quite simple. If the current signal energy is above the noise estimate plus a given threshold, then voice is detected. Note that these parameters are preferably in dB because effectively we are comparing the current signal-to-noise ratio with a given threshold.

$$\text{Signal Energy (dB)} \geq \text{Noise Est (dB)} + \text{Threshold (dB)}$$

There are two degrees of freedom given with the decision equation: computation rate and threshold. The computation rate refers to how often the decision equation is computed and how many detects are needed in a row before voice is "officially" determined to be present. For the forward channel, the decision equation is computed every 2 ms and require ten consecutive voice detects before voice is officially determined to be present. This makes the voice detection robust in the presence of short noises, i.e., lip smacks.

Figures 12, 13:
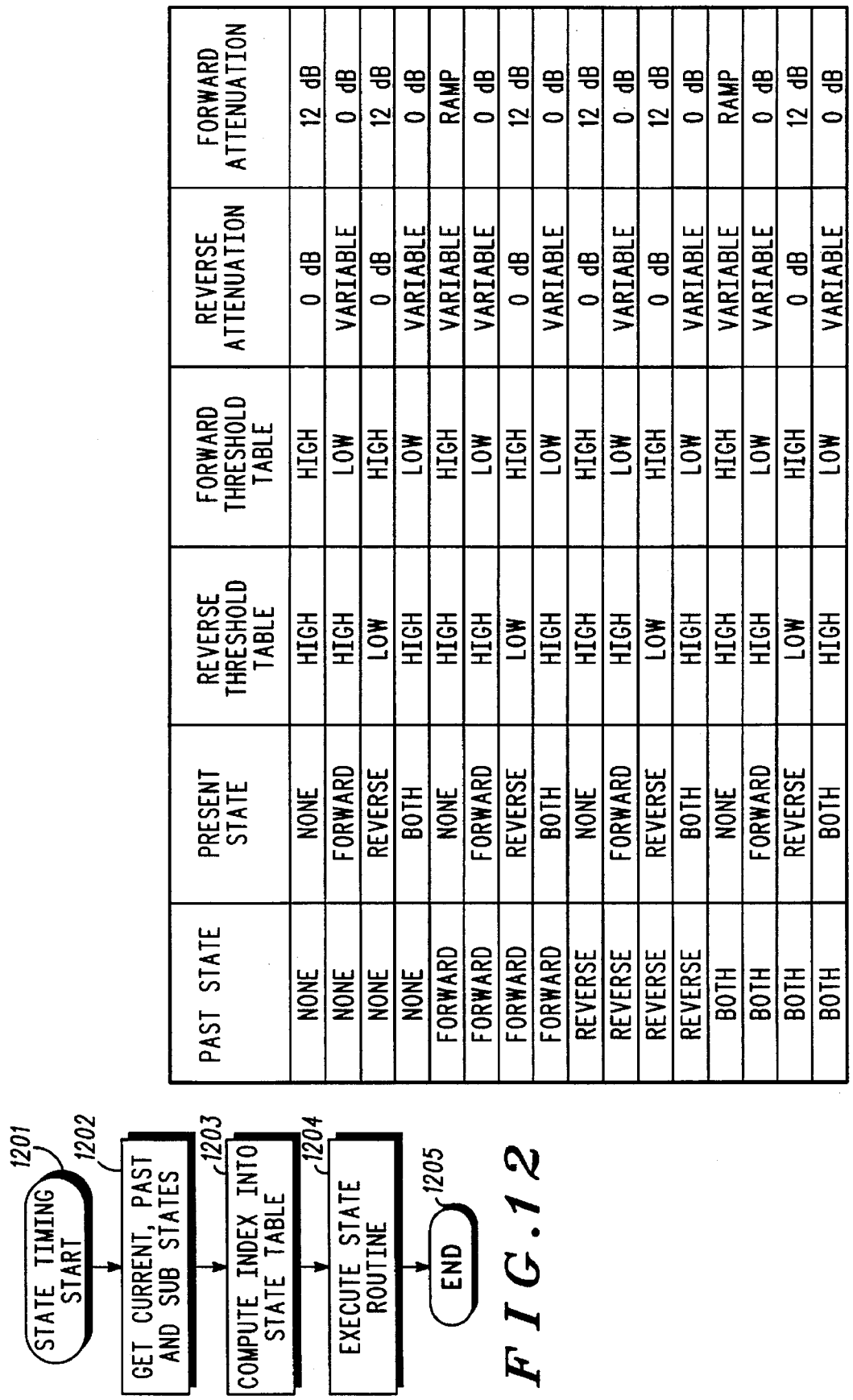
FIG. 12 illustrates a process flow diagram performed by the state timing process of the process flow diagram performed by the audio processor of FIG. 4, in accordance with the present invention.
FIG. 13 illustrates a table depicting forward and reverse threshold levels, and reverse and forward attenuation levels, respectively, for various possible voice detection combinations, in accordance with the present invention.

FIG. 13 illustrates a table depicting forward and reverse threshold levels, and reverse and forward attenuation levels, respectively, for various possible voice detection combinations, in accordance with the present invention. The thresholds used in the decision equation are dependent on two factors: the noise floor and whether or not voice is currently determined to be present. When the forward voice is not currently determined to be present, a high threshold table is used; otherwise, a low threshold table is used. The elements in the threshold tables are arranged in order of 2 dB increments of the noise floor, i.e., the first entry represents the threshold used when the noise floor is 0 dB, and the second entry is the threshold used when the noise floor is 2 dB, etc... The threshold tables are determined experimentally. These tables provide the greatest flexibility along with the ease of computation.

Figure 10:
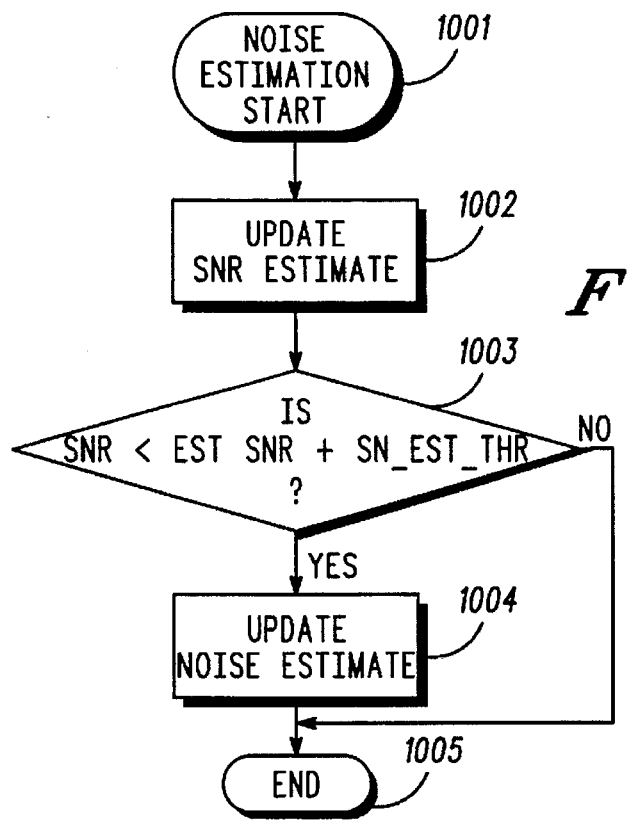
FIG. 10 illustrates a process flow diagram performed by the noise estimation process of the process flow diagram performed by the audio processor of FIG. 4, in accordance with the present invention.

FIG. 10 illustrates a process flow diagram performed by the noise estimation process of the process flow diagram performed by the audio processor of FIG. 4, in accordance with the present invention. At step 1001, the noise estimation process begins. At step 1002, the signal to noise ratio is updated. At step 1003, a determination is made whether the signal to noise ratio is less than the estimate of the signal to noise ratio plus the signal to noise ratio estimate threshold. If the determination at step 1003 is positive, the noise estimate is updated at step 1004 then ends at step 1005. If the determination at step 1003 is negative, the process ends at step 1005.

Noise Estimation Process

The foundation of voice detection is noise estimation. If the noise estimate is not accurate, the voice detection will be unreliable. The characterization of noise is based solely on a temporal average of energy. This was done to simplify the voice detection process.

There is one precondition required before the noise estimate can be updated. This precondition is based on the value of the current signal-to-noise ratio, the estimated signal-to-noise ratio, and a threshold constant SN_EST_THR. The current signal-to-noise ratio is calculated by taking the energy of the current speech frame and dividing by the current noise energy estimate. The estimated signal-to-noise ratio is calculated similar to the noise estimate itself. It is based off an update equation given below.

$$\hat{SNR} = \begin{cases} \hat{SNR} + SN\_EST\_INC & \text{for } \hat{SNR} < SNR \\ SNR & \text{for } \hat{SNR} \geq SNR \end{cases}$$

The current value for SN_EST_INC is 0.125 dB. This is equivalent to a rate of 6.25 dB per second.

The noise estimate itself, then will be updated if the following precondition equation is true.

$$SNR < \hat{SNR} + SN\_EST\_THR$$

The current value of SN_EST_THR is 3 dB. In other words, if the current signal-to-noise ratio of the signal is 3 dB above the estimated signal-to-noise ratio, the noise estimate will not be updated (it is assumed that speech is present). If this elevated SNR continues, the estimated SNR will approach it (at the rate of 6.25 dB/sec) and the noise estimate will be updated. This precondition equation protects the noise estimate from adapting during periods of voice. It also makes the noise estimate resilient to sudden changes in the noise floor. Furthermore, the larger the change in the noise floor the more resilient to change the estimate becomes.

When the precondition statement is true, the update equation for the noise estimate is as follows.

$$\hat{N} = \begin{cases} \hat{N} + RO\_NOISE\_INC & \text{for } SNR > 0 \\ \text{Signal Energy} & \text{for } SNR < 0 \end{cases}$$

The current value for RO_NOISE_INC is 0.125 dB. This is equivalent to a rate of 6.25 dB per second.

Figure 11:
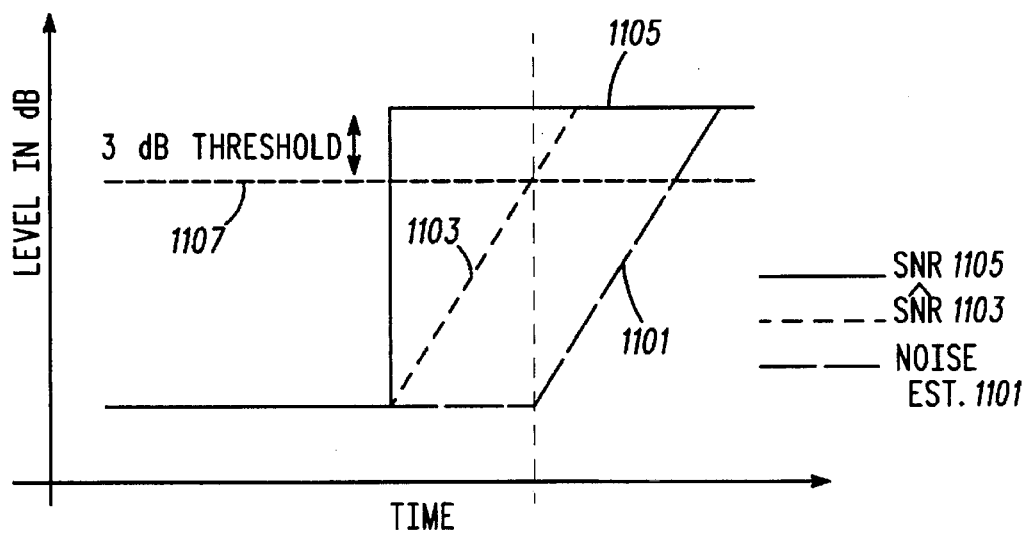
FIG. 11 illustrates a graph of the response of the noise estimate to a unit step function as related to the process flow diagram performed by the noise estimation process of FIG. 10, in accordance with the present invention.

FIG. 11 illustrates a graph of the response of the noise estimate to a unit step function as related to the process flow diagram performed by the noise estimation process of FIG. 10, in accordance with the present invention. With the above equations, one could calculate the time it takes for the noise estimate to adapt to a unit step 1105. Looking at FIG. 11, we see that the noise estimate 1101 doesn't begin to adapt until the SNR estimate 1103 is within 3 dB of the current SNR 1107. Once this point is reached, the noise can begin to adapt at its designed rate (6.25 dB/sec). Therefore, the total time for the noise to adapt is $$T = \frac{SNR - \hat{SNR} - 3}{SN\_EST\_INC} + \frac{SNR - \text{Noise } Est}{RO\_NOISE\_INC}$$

where SN_EST_INC=0.125 dB/20 ms and RO_NOISE_INC=0.125 dB/20 ms. This equation once again shows that the larger the change in the noise floor, the longer it will take the noise estimate to adapt.

Reverse Speech Process

Reverse speech path processing is not as critical as the forward speech path. This is because most of the path attenuation is determined from the state of the forward channel alone. Also, it is known that the reverse speech will contain only a mobile talkers voice. There is little need to be concerned with the characteristics of a landside talker. With this in mind, a more simplistic approach can implemented for the reverse speech process to save digital signal processing (DSP) resources.

Voice Detection

Voice detection is similar to the forward path; the decision equation is identical with just a change in the variables. To save million instruction cycles per second, the reverse channel has a computation rate of 20 ms, because the mobile path is not as susceptible to the short noises as the forward path. With a 20 ms computation rate, only 1 voice detect is required to officially determine voice to be present on the reverse channel. The other differences are in the threshold tables (see FIG. 13). These tables were determined from lab experiments to best suit the mobile talker.

Noise Estimation

The noise estimation process for the reverse speech is identical to the forward speech process. See the forward speech process.

State Timing

FIG. 12 illustrates a process flow diagram performed by the state timing process of the process flow diagram performed by the audio processor of FIG. 4, in accordance with the present invention. At step 1201 the state timing process begins. At step 1202, the current, past and substates are retrieved. At step 1203, the index into a state table is computed. At step 1204, the state routine is executed. At step 1205; the state timing process ends.

The state timing algorithm controls the timing of when the attenuation process should be activated and, in the case of the forward path, how much attenuation should be used. It also controls which threshold table is used during the voice detection process. The state timing algorithm takes as input, the current voice detection decisions (if forward and/or reverse voice is present), the past voice detection decisions (the decisions made 20 ms ago), and the sub-state which denotes progression inside of a state. FIG. 13 illustrates which threshold table and what attenuation level is used during the various possible voice detection combinations.

FIG. 13 illustrates a table depicting forward and reverse threshold levels, and reverse and forward attenuation levels, respectively, for various possible voice detection combinations, in accordance with the present invention.

Note that the transitions from forward or both to forward or both assume that the guard time has expired. The guard time is a fixed amount of time (currently 160 ms) after the forward talker stops talking. It is called the guard time because during this time, the forward channel still remains in control (i.e. the reverse talker can not steal the path). If the guard time has expired and the reverse channel is active, the path will switch over to the reverse side (as the table indicates . . . Forward Reverse). If, however, the guard time expires and the reverse channel is not active, then a process called ramping occurs. This ramps the attenuation of the forward path from no attenuation to maximum attenuation. It completes the ramping process in 300 ms which makes the transition sound more pleasing to the ear. During the ramping process, the reverse attenuation remains variable. After ramping is complete, the reverse attenuation becomes 0 dB and the forward attenuation stays at 12 dB (the final attenuation step in the ramping process).

Path Attenuation

Figure 14:
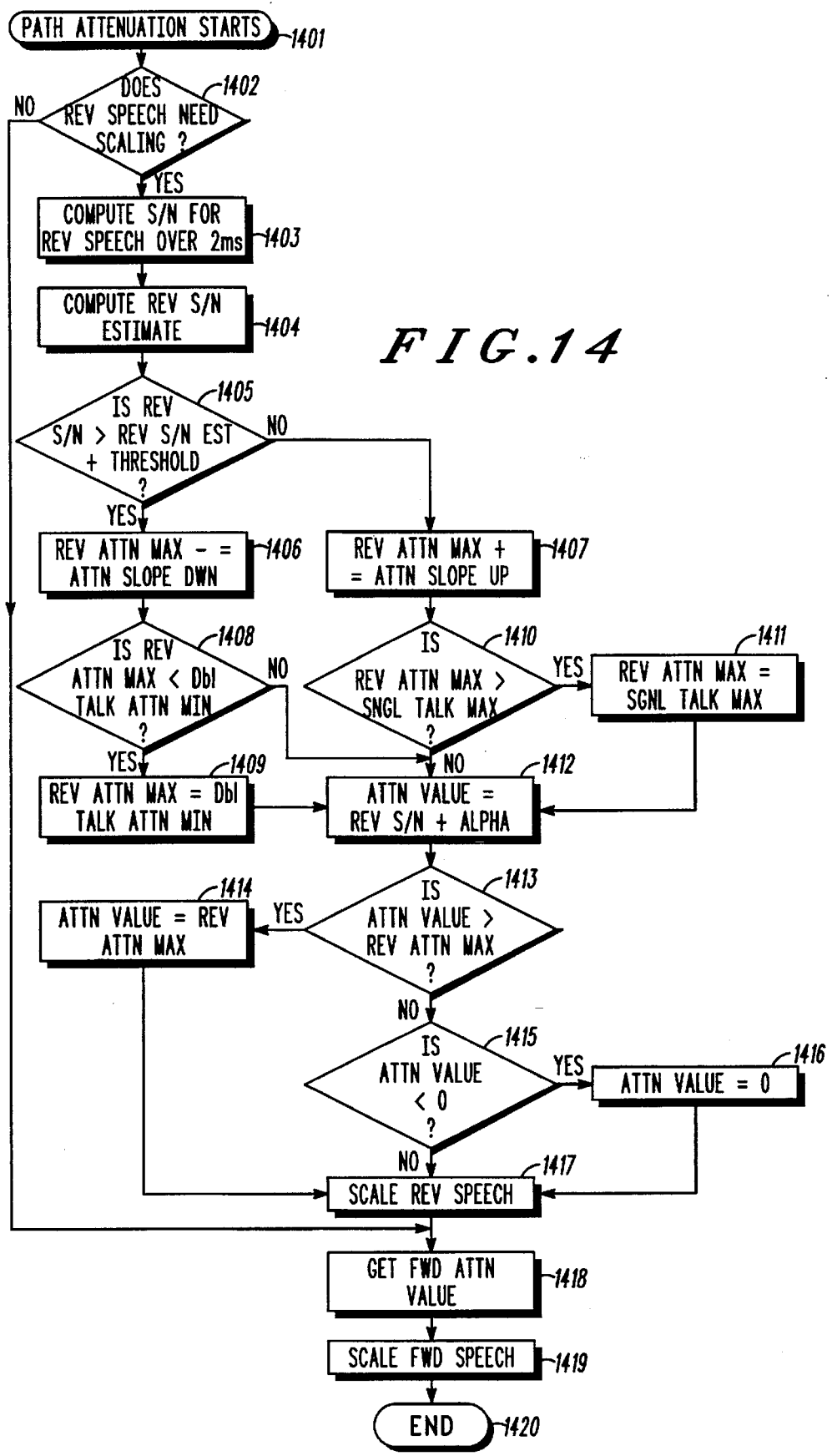
FIG. 14 illustrates a process flow diagram performed by the path attenuation process of the process flow diagram performed by the audio processor of FIG. 4, in accordance with the present invention.

FIG. 14 illustrates a process flow diagram performed by the path attenuation process of the process flow diagram performed by the audio processor of FIG. 4, in accordance with the present invention. At step 1401, the path attenuation process begins. At step 1402, a determination is made whether the reverse speech signal needs scaling. If the determination at step 1402 is negative the flow proceeds to step 1418, wherein a forward attenuation value is retrieved. Otherwise, if the determination at step 1402 is positive, the signal to noise ratio for reverse speech is computed over 2 ms at step 1403. At step 1404, a reverse signal to noise ratio estimate is computed. At step 1405, a determination is made whether the reverse signal to noise ratio is greater than the reverse signal to noise ratio estimate plus the threshold. If the determination at step 1405 is positive, the maximum reverse attenuation is adjusted by the fixed downward attenuation slope at step 1406. Otherwise if the determination at step 1405 is negative, the maximum reverse attenuation is adjusted by the fixed upward attenuation slope at step 1407. Proceeding from step 1406, at step 1408, a determination is made whether the maximum reverse attenuation is less than the double talk minimum attenuation. If the determination at step 1408 is positive, the maximum reverse attenuation is set equal to the double talk minimum attenuation at step 1409. Otherwise, if the determination at step 1408 is negative, the attenuation value is set equal to the reverse signal to noise ratio plus alpha at step 1412.

Proceeding from step 1407, at step 1410, a determination is made whether the reverse maximum attenuation is greater than the maximum single talk signal. If the determination at step 1410 is positive, the maximum reverse attenuation is set equal to the maximum single talk signal at step 1411. Otherwise, if the determination at step 1410 is negative, the attenuation value is set equal to the reverse signal to noise ratio plus alpha at step 1412. Likewise, proceeding from steps 1411 and 1409, the attenuation value is set equal to the reverse signal to noise ratio value plus alpha at step 1412.

Proceeding from step 1412, at step 1413, a determination is made whether the attenuation value is greater than the maximum reverse attenuation. If the determination at step 1413 is positive, the attenuation value is set equal to the reverse maximum attenuation at step 1414. Otherwise, if the determination at step 1413 is negative, a determination is made whether the attenuation value is less than zero at step 1415. If the determination at step 1415 is positive, the attenuation value is set to zero at step 1416. Otherwise, if the determination at step 1415 is negative, the reverse speech is scaled at step 1417. Further, proceeding from step 1414, at step 1417, the reverse speech is also scaled.

Proceeding from step 1417, at step 1418, the forward attenuation value is retrieved. At step 1419, the forward speech is scaled. At step 1420 the path attenuation process ends.

The path attenuation helps the echo canceller in eliminating the return acoustic echo. It is applied to both the forward and reverse path governed by the voice detection equations and the state timer. There are three states for the forward attenuation: no attenuation, maximum attenuation (currently 12 dB), or ramping. When no attenuation is the current state, the samples are basically transferred into the output buffer with no change. When maximum attenuation is the current state, the samples are multiplied by 0.251188643 (which is equivalent to −12 dB) before they are moved into the output buffer. During ramping, the last state, the attenuation ramps linearly from 0 dB to 12 dB. Its value is determined in the state timing algorithm. Ramping is done to make the transition from no attenuation to maximum attenuation gradual. The ramp time is preferably 300 ms.

The reverse attenuation process is more complex, even though there are just two possible states: no attenuation and variable attenuation. No attenuation is identical to the forward channel and the samples are past by unchanged. During variable attenuation, the samples are attenuated based on the signal to noise ratio of the reverse channel.

$$Rev\ Attn = S/N_{rev} + 7\ dB$$

Figure 15:
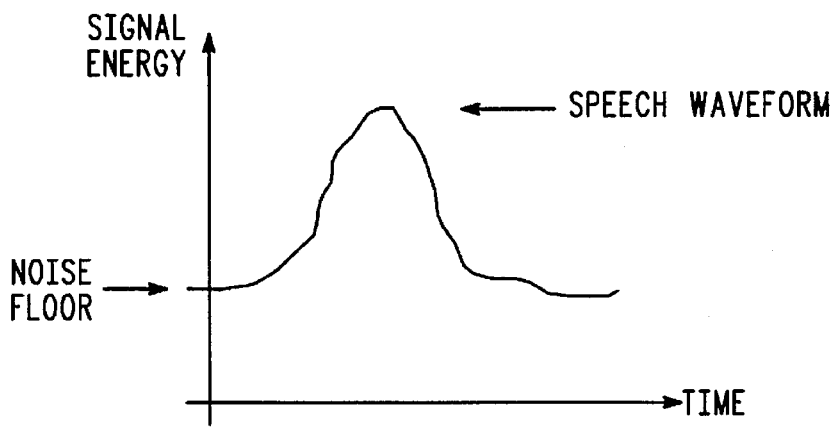
FIG. 15 illustrates a graph depicting signal energy of echoed speech versus time at the input to the audio processor of FIG. 3, in accordance with the present invention.

FIG. 15 illustrates a graph depicting signal energy of echoed speech versus time at the input to the audio processor of FIG. 3, in accordance with the present invention.

Figure 16:
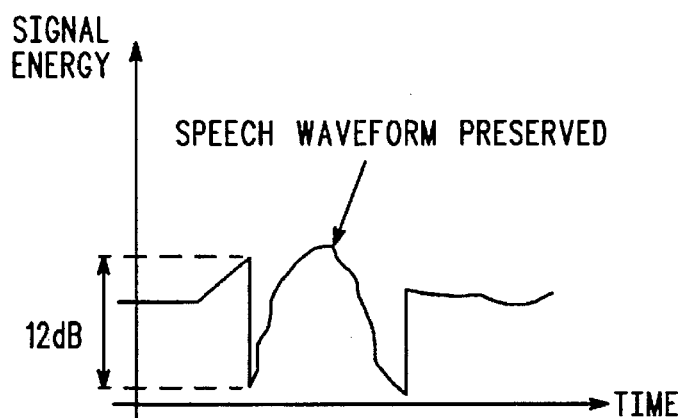
FIG. 16 illustrates a graph depicting the signal energy of echoed speech versus time when processed using an audio processor, in accordance with the prior art.

FIG. 16 illustrates a graph depicting the signal energy of echoed speech versus time when processed using an audio processor, in accordance with the prior art.

Figure 17:
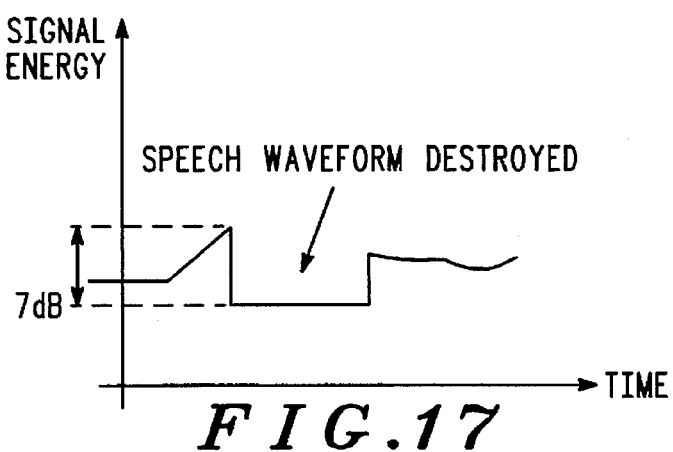
FIG. 17 illustrates a graph depicting the signal energy of echoed speech versus time when processed using the audio processor of FIG. 3, in accordance with the present invention.

FIG. 17 illustrates a graph depicting the signal energy of echoed speech versus time when processed using the audio processor of FIG. 3, in accordance with the present invention.

The present invention has an advantage over current methods, using a constant 12 dB of attenuation, by dynamically changing the attenuation when it needs more to cancel out the return echo. Likewise, when the echo is not as strong (higher performance from the echo canceller) the attenuation will be less. To take full advantage of this design, the attenuation is changed very rapidly (every 2 ms). By doing this, the information content of the echo (FIG. 15) is destroyed and therefore no echo can be heard (FIG. 17). As shown in FIG. 16, the waveform of the echo is still preserved under the conventional attenuation process. Even though the echo is lower in energy, it still can be perceived an understood as echoed speech. FIG. 17 shows that with the new attenuation process, the waveform of the echo is destroyed and there is little perception of the echo as speech. Because the attenuation process keeps the signal energy a constant 7 dB below the noise floor, the background noise is not perceived to fluctuate as much as in the conventional case (12 dB drop in the noise floor). Therefore the connection is perceived to sound more full duplex.

Finally, to help the ability to interrupt, a limit is placed on the maximum attenuation allowed by the variable attenuator. There are two limit values—DBL_TALK_MAX=10 dB and SNGL_TALK_MAX=50 dB. When double talk is detected, the maximum attenuation level is decremented down to DBL_TALK_MAX at a rate of 4 dB every 2 ms. Likewise, when single talk is detected, the maximum attenuation level is incremented up to SNGL_TALK_MAX at a rate of 4 dB every 2 ms. The talk status is determined every 2 ms.

The algorithm used to detect double talk status uses a simplistic approach which compares an estimate of the reverse signal to noise ratio to the actual signal to noise ratio. If the actual S/N is greater than the estimated S/N, it is assumed that there are two talkers. If $$S/N_{rev} > S/N_{est} + REV\_SN\_THR$$

where $$S/N_{est} = Fwd\_Energy - Ave\_ERL - Rev\_Noise\ (all\ in\ dB)$$

and REV_SN_THR=5 dB, then decide double talker. Else decide single talker.

Conclusion

Thus, the present invention provides an audio signal processor and method therefor for substantially reducing audio feedback in a communication unit. The present invention advantageously reduces audio feedback in a digital communication system where audio processing times are long. This advantage is primarily provided by an audio signal processor comprising a first signal path having a first audio signal and a second signal path having a second audio signal, wherein at least a portion of the first audio signal is coupled to the second signal path to produce a feedback audio signal on the second signal path. An attenuator, coupled to the second signal path, attenuates the second audio signal responsive to a measure of the feedback audio signal. The present invention substantially resolves the problems of undesirable audio feedback in prior art digital communication systems.

While the present invention has been described with reference to illustrative embodiments thereof, it is not intended that the invention be limited to these specific embodiments. Those skilled in the art will recognize that variations and modifications can be made without departing from the spirit and scope of the invention as set forth in the appended claims.

What is claimed is:

1. An audio signal processor for substantially reducing audio feedback in a communication unit, comprising:
   a first signal path having a first audio signal;
   a second signal path having a second audio signal, wherein at least a portion of the first audio signal is coupled to the second signal path to produce a feedback audio signal on the second signal path;
   a signal estimator for providing a signal estimate of the feedback audio signal;
   a noise estimator for providing a noise estimate of the feedback audio signal; and
   an attenuator, coupled to the second signal path, for attenuating the second audio signal responsive to a measure of the signal estimate and the noise estimate of the feedback audio signal.

2. An audio signal processor in accordance with claim 1 wherein the measure of the signal estimate and the noise estimate of the feedback audio signal further comprises a signal to noise ratio measurement of the feedback audio signal.

3. An audio signal processor in accordance with claim 1 wherein the second signal path is coupled to receive a third audio signal, and wherein the attenuator for attenuating the second audio signal is further responsive to at least one of the first audio signal and the third audio signal.

4. An audio signal processor in accordance with claim 1 wherein the first and second signal paths further comprise forward and reverse signal paths, respectively.

5. An audio signal processor in accordance with claim 1 wherein the first and second signal paths further comprise reverse and forward signal paths, respectively.

6. An audio signal processor for substantially reducing audio feedback in a communication unit, comprising:
- a forward signal path having a forward audio signal coupled to a loudspeaker for producing a first acoustic signal;
- a reverse signal path coupled to a microphone for producing a reverse audio signal, wherein at least a portion of the first acoustic signal is coupled to the microphone for producing a feedback audio signal on the reverse signal path;
- a signal estimator for providing a signal estimate of the feedback audio signal;
- a noise estimator for providing a noise estimate of the feedback audio signal; and
- an attenuator, coupled to the microphone, for attenuating the reverse audio signal responsive to a measure of the signal estimate and the noise estimate of the feedback audio signal.

7. An audio signal processor in accordance with claim 6 wherein the measure of the signal estimate and the noise estimate of the feedback audio signal further comprises a signal to noise ratio measurement of the feedback audio signal.

8. An audio signal processor in accordance with claim 6 wherein the reverse signal path is coupled to receive an acoustic audio signal, and wherein the attenuator for attenuating the reverse audio signal is further responsive to at least one of the forward audio signal and the acoustic audio signal.

9. An audio signal processor for substantially reducing audio feedback in a communication unit, comprising:
- a reverse signal path coupled to a microphone for producing a reverse audio signal;
- a forward signal path having a forward audio signal coupled to a loudspeaker, wherein at least a portion of the reverse audio signal is coupled to the forward signal path to produce a feedback audio signal on the forward signal path;
- a signal estimator for providing a signal estimate of the feedback audio signal;
- a noise estimator for providing a noise estimate of the feedback audio signal; and
- an attenuator, coupled to the loudspeaker, for attenuating the forward audio signal responsive to a measure of the signal estimate and the noise estimate of the feedback audio signal.

10. An audio signal processor in accordance with claim 9 wherein the measure of the signal estimate and the noise estimate of the feedback audio signal further comprises a signal to noise ratio measurement of the feedback audio signal.

11. An audio signal processor in accordance with claim 9 wherein the forward signal path is coupled to receive an acoustic audio signal, and wherein the attenuator for attenuating the forward audio signal is further responsive to at least one of the forward audio signal and the acoustic audio signal.

12. An audio signal processor for substantially reducing audio feedback in a communication unit, comprising:
- a first signal path having a first attenuator coupled to a loudspeaker and a first audio signal coupled to the loudspeaker for producing a first acoustic signal;
- a second signal path coupled to a microphone, coupled to a second attenuator, for producing a second audio signal, wherein at least a portion of the first acoustic signal is coupled to the microphone to produce a feedback audio signal on the second signal path;
- an echo canceller coupled to receive the first audio signal, the second audio signal and an error signal, and operative to produce an estimate of the second audio signal and an echo return loss signal;
- a first signal processor for measuring the level of the first audio signal to produce a first measured signal;
- a first signal level detector for detecting the presence of the first audio signal to produce a first detected signal responsive to the first measured signal, wherein the first detected signal is coupled to the first and the second attenuators;
- a second signal processor for measuring the level of the second audio signal to produce a second measured signal;
- a second signal level detector for detecting the presence of the second audio signal to produce a second detected signal responsive to the first and second measured signals and the echo return loss signal;
- a signal estimator for providing a signal estimate of the feedback audio signal;
- a noise estimator for providing a noise estimate of the feedback audio signal; and
- an attenuation controller for controlling the second attenuator responsive to a measure of the signal estimate and the noise estimate of the feedback audio signal.

13. An audio signal processor in accordance with claim 12 wherein the measure of the signal estimate and the noise estimate of the feedback audio signal further comprises a signal to noise ratio measurement of the feedback audio signal.

14. An audio signal processor in accordance with claim 12 wherein the second signal path is coupled to receive a third audio signal, and wherein the attenuator for attenuating the second audio signal is further responsive to at least one of the first audio signal and the third audio signal.

15. In an audio signal processor including a first signal path having a first audio signal and a second signal path having a second audio signal, wherein at least a portion of the first audio signal is coupled to the second signal path to produce a feedback audio signal on the second signal path, a method for substantially reducing audio feedback in a communication unit, comprising the steps of:
- measuring a signal estimate and a noise estimate of the feedback audio signal; and
- attenuating the second audio signal responsive to the measure of the signal estimate; and the noise estimate of the feedback audio signal.

16. A method in accordance with claim 15 wherein the measure of the signal estimate and the noise estimate of the feedback audio signal further comprises a signal to noise ratio measurement of the feedback audio signal.

17. A method in accordance with claim 15 wherein the second signal path is coupled to receive a third audio signal, and wherein the step of attenuating the second audio signal is further responsive to at least one of the first audio signal and the third audio signal.

18. A method in accordance with claim 15 wherein the first and second signal paths further comprise forward and reverse signal paths, respectively.

19. A method in accordance with claim 15 wherein the first and second signal paths further comprise reverse and forward signal paths, respectively.

20. In an audio signal processor including a forward signal path having a forward audio signal coupled to a loudspeaker for producing a first acoustic signal and a reverse signal path coupled to a microphone for producing a reverse audio signal, wherein at least a portion of the first acoustic signal is coupled to the microphone for producing a feedback audio signal on the reverse signal path, a method for substantially reducing audio feedback in a communication unit, comprising the steps of:

measuring a signal estimate and a noise estimate of the feedback audio signal; and attenuating the reverse audio signal responsive to the measure of the signal estimate and the noise estimate of the feedback audio signal.

21. A method in accordance with claim 20 wherein the measure of the signal estimate and the noise estimate of the feedback audio signal further comprises a signal to noise ratio measurement of the feedback audio signal.

22. A method in accordance with claim 20 wherein the reverse signal path is coupled to receive an acoustic audio signal, and wherein the step of attenuating the reverse audio signal is further responsive to at least one of the first forward audio signal and the acoustic audio signal.

23. In an audio signal processor including a reverse signal path coupled to a microphone for producing a reverse audio signal, and a forward signal path having a forward audio signal coupled to a loudspeaker, wherein at least a portion of the reverse audio signal is coupled to the forward signal path to produce a feedback audio signal on the forward signal path, a method for substantially reducing audio feedback in a communication unit, comprising the steps of:

measuring a signal estimate and a noise estimate of the feedback audio signal; and attenuating the forward audio signal responsive to the measure of the signal estimate and the noise estimate of the feedback audio signal.

24. A method in accordance with claim 23 wherein the measure of the signal estimate and the noise estimate of the feedback audio signal further comprises a signal to noise ratio measurement of the feedback audio signal.

25. A method in accordance with claim 23 wherein the forward signal path is coupled to receive an acoustic audio signal, and wherein the step of attenuating the forward audio signal is further responsive to at least one of the forward audio signal and the acoustic audio signal.

26. In an audio signal processor including a first signal path having a first attenuator coupled to a loudspeaker and a first audio signal coupled to the loudspeaker for producing a first acoustic signal, a second signal path coupled to a microphone, coupled to a second attenuator, for producing a second audio signal, wherein at least a portion of the first acoustic signal is coupled to the microphone to produce a feedback audio signal on the second signal path, and an echo canceller coupled to receive the first audio signal, the second audio signal and an error signal, and operative to produce an estimate of the second audio signal and an echo return loss signal, a method for substantially reducing audio feedback in a communication unit, comprising the steps of:

measuring the level of the first audio signal to produce a first measured signal;

detecting the presence of the first audio signal to produce a first detected signal responsive to the first measured signal, wherein the first detected signal is coupled to the first and the second attenuators;

measuring the level of the second audio signal to produce a second measured signal;

detecting the presence of the second audio signal to produce a second detected signal responsive to the first and second measured signals and the echo return loss signal;

measuring a signal estimate and a noise estimate of the feedback audio signal; and controlling the attenuation of the second audio signal responsive to a measure of the signal estimate and the noise estimate of the feedback audio signal.

27. A method in accordance with claim 26 wherein the measure of the signal estimate and the noise estimate of the feedback audio signal further comprises a signal to noise ratio measurement of the feedback audio signal.

28. A method in accordance with claim 26 wherein the second signal path is coupled to receive a third audio signal, and wherein the step of controlling the attenuation of the second audio signal is further responsive to at least one of the first audio signal and the third audio signal.

\* \* \* \* \*